US012741363B2

(12) United States Patent
Cai et al.

(10) Patent No.: US 12,741,363 B2
(45) Date of Patent: Sep. 22, 2026

(54) LOCKING BUCKLE FOR TOOLBOX WITH DRAWERS

(71) Applicant: Meridian International Co., Ltd., Songjiang (CN)

(72) Inventors: Shujun Cai, Songjiang (CN); Qiang Wang, Songjiang (CN); Zhengning Zhang, Songjiang (CN)

(73) Assignee: Meridian International Co., Ltd, Shanghai (CN)

( * ) Notice: Subject to any disclaimer, the term of this patent is extended or adjusted under 35 U.S.C. 154(b) by 147 days.

(21) Appl. No.: 18/652,973

(22) Filed: May 2, 2024

(65) Prior Publication Data

US 2024/0426139 A1 Dec. 26, 2024

(51) Int. Cl.

| | |
|---|---|
| ***B25H 3/02*** | (2006.01) |
| *A47B 63/02* | (2006.01) |
| *E05B 65/46* | (2017.01) |
| *E05B 65/462* | (2017.01) |

(52) U.S. Cl.

CPC ............... *B25H 3/028* (2013.01); *B25H 3/02* (2013.01); *B25H 3/023* (2013.01); *A47B 63/02* (2013.01); *E05B 65/462* (2013.01)

(58) Field of Classification Search

CPC .......... B25H 3/028; B25H 3/02; B25H 3/023; A47B 63/02; E05B 65/462

See application file for complete search history.

(56) References Cited

U.S. PATENT DOCUMENTS

| | | | | |
|---|---|---|---|---|
| 8,944,537 | B1 * | 2/2015 | Manalang | B25H 3/028 312/319.2 |
| 10,954,696 | B2 * | 3/2021 | Grela | E05B 7/00 |
| 11,642,777 | B2 * | 5/2023 | Baruch | B25H 3/022 403/322.4 |
| 2008/0303397 | A1 * | 12/2008 | Chen | A47B 88/427 312/334.46 |
| 2011/0309730 | A1 * | 12/2011 | Retchloff | E05C 3/14 292/210 |
| 2015/0145383 | A1 * | 5/2015 | Grela | A47B 81/00 312/215 |
| 2018/0320422 | A1 * | 11/2018 | Sharp | E05C 1/14 |
| 2020/0378160 | A1 * | 12/2020 | Chen | E05B 37/02 |
| 2021/0062382 | A1 * | 3/2021 | Andrejczuk | D06F 17/10 |
| 2022/0369781 | A1 * | 11/2022 | Brunner | A45C 5/14 |
| 2023/0136626 | A1 * | 5/2023 | Cai | B25H 3/02 206/503 |

* cited by examiner

*Primary Examiner* — David M Upchurch

(74) *Attorney, Agent, or Firm* — Eversheds Sutherland (US) LLP

(57) ABSTRACT

A push lock body; multiple locking tongues set on the push lock body, wherein the locking buckle structure has a locking/unlocking position, and the each of the multiple drawers has a closing and pulling position; wherein when the locking buckle structure is in the locked position, the drawers are in the closed position and locked with the corresponding locking tongue, and wherein when the drawer is in the pulled out position, the drawers can be moved to the closed position and locked with the corresponding locking tongue; and wherein when the locking buckle structure is in the unlocked position, the drawers located in the closed, pulled out position are all unlocked with the corresponding locking tongue.

20 Claims, 9 Drawing Sheets

LOCKING BUCKLE FOR TOOLBOX WITH DRAWERS

PRIORITY CLAIM

The present application claims the benefit of Chinese Patent Application 2023215871673 filed Jun. 20, 2023, and Chinese Patent Application 2023215925090 filed Jun. 20, 2023, the contents of each of which are hereby incorporated by reference herein.

TECHNICAL FIELD

This utility model relates to the field of item storage technology, in particular to a locking buckle structure and a drawer box with the locking buckle structure.

BACKGROUND INFORMATION

Most of the existing conventional drawer boxes on the market are individually locked for a single drawer, and when unlocked, they are also individually unlocked for the drawer to be used. However, as professional users bring more and more tools, different tools need to be placed in different drawers for easy use and classification. Therefore, the method of locking and unlocking a single drawer separately is not suitable for practical use scenarios, because as the number of drawers increases, it is very inconvenient to lock and unlock a drawer separately. For example, if there are four drawers and different drawers need to be opened and closed from time to time during work, locking the drawers separately requires repeated unlocking to achieve the function of extracting the required drawers.

In view of this, it is necessary to design a lock structure that reduces user operation steps and a drawer box with this lock structure.

SUMMARY

In one implementation, this utility model provides a locking buckle structure and a drawer box, so that multiple drawers of the drawer box can be simultaneously locked and unlocked by operating the locking buckle structure once, and a single drawer can also be individually locked, reducing the user's operating steps and having a simple structure.

This utility model provides a locking buckle structure for use in a drawer box, wherein the locking buckle structure comprises a push lock body and multiple locking tongues set on the push lock body. The drawer box is equipped with multiple drawers, and the locking buckle structure has a locking/unlocking position, and the drawers have a closing/pulling position; When the locking buckle structure is in the locked position, the drawer in the closed position is locked with the corresponding locking tongue, and the drawer in the pulled out position can be moved to the closed position and locked with the corresponding locking tongue; When the locking buckle structure is in the unlocked position, the drawers located in the closed/pulled out position are all unlocked with the corresponding locking tongue.

Furthermore, the locking buckle structure further comprises a first elastic member located between the push lock body and each locking tongue, which automatically ejects the locking tongue relative to the push lock body.

Furthermore, each drawer is equipped with a locking block corresponding to the locking tongue; When the locking buckle structure is in the locking position, the locking block of the drawer in the pull-out position can be locked over the locking tongue, and the locking block is located on the side of the locking tongue away from the opening of the drawer box.

Furthermore, each locking block forms a locking groove around the drawer body, and the locking groove is located on the side of the locking block near the opening of the drawer box; When the locking buckle structure is in the locked position and the drawer is in the closed position, the locking tongue is clamped in the corresponding locking groove.

Furthermore, a second oblique cutting surface is provided on one side of the locking tongue near the opening, and a pushing part is provided on the locking block; When the locking buckle structure is in the locking position, the pushing part of the drawer located in the pull-out position pushes the second oblique section over the locking tongue to move to the closed position for locking.

Furthermore, a first straight surface is provided on the same side as the second oblique cutting surface on the locking tongue, and a second straight surface is provided on the opposite side of the first straight surface. The first straight surface is opposite to the second straight surface; When the locking buckle structure is in the locked position, the locking block of the drawer in the closed position pushes the second straight surface of the locking tongue towards the opening direction, and the first straight surface interferes with the push lock body, and the locking tongue remains ejected.

Furthermore, the locking tongue is provided with a first oblique cutting surface, and a support portion is provided on the drawer or drawer box body; When the supporting part is in contact with the first oblique section, the locking buckle structure remains in the locked or unlocked position.

Furthermore, the push lock body is equipped with a locking tongue accommodating groove, and the first elastic member is a spring. One end of the first elastic member is fixed in the locking tongue accommodating groove, and the locking tongue is fixed at the other end of the first elastic member.

Furthermore, the push lock body is equipped with a locking tongue accommodating groove, and the first elastic member is a spring piece. One end of the first elastic member is fixed on the push lock body, and the locking tongue is fixed on the other end of the first elastic member.

Furthermore, it also includes a second elastic member located between the locking buckle structure and the drawer box, which automatically maintains the locking position of the locking buckle structure.

Furthermore, the locking buckle structure further comprises a lock bolt, which is fixed on the push lock body, and a buckle that is matched with the lock bolt is provided on the drawer box. The lock bolt and the buckle can be mutually locked.

This utility model also provides a drawer box, comprising a locking buckle structure as described in any one of the preceding items.

The beneficial effects of this utility model are:

1. By operating the locking buckle structure once, multiple drawers of the drawer box can be locked and unlocked simultaneously, reducing the number of steps for users to operate.
2. When the drawer is opened, when the locking buckle structure is in the locked position, the function of freely locking a single drawer can be achieved without operating the push lock body, further reducing the user's operating steps.

To make the advantages of the present utility model clearer, the following will further describe the implementation method of the present utility model in conjunction with the accompanying drawings.

In another implementation, the present utility model provides a locking buckle structure and a drawer box, so that by operating the locking buckle structure once, multiple drawers of the drawer box can be simultaneously locked and unlocked, and a single drawer can also be locked, reducing the user's operation steps.

This utility model provides a locking buckle structure for use in a drawer box, wherein the locking buckle structure comprises a push lock body and multiple locking tongues set on the push lock body. The multiple locking tongues need to move simultaneously to lock/unlock. The drawer box is equipped with multiple drawers, and the locking buckle structure has a locking/unlocking position, and the drawer has a closing/pulling position; When the locking buckle structure is in the locked position, the drawer in the closed position is locked with the corresponding locking tongue, and the drawer in the pulled out position can be moved to the closed position and locked with the corresponding locking tongue.

Furthermore, the locking buckle structure further comprises a first elastic member located between the push lock body and the drawer box, which automatically maintains the locking position of the locking buckle structure.

Furthermore, each drawer is equipped with a locking block corresponding to the locking tongue. When the locking buckle structure is in the locking position, the locking block of the drawer in the pull-out position can be locked over the locking tongue, and the locking block is located on the side of the locking tongue away from the opening of the drawer box.

Furthermore, each locking block forms a locking groove around the drawer body, and the locking groove is located on the side of the locking block near the opening; When the locking buckle structure is in the locked position and the drawer is in the closed position, the locking tongue is clamped in the corresponding locking groove.

Furthermore, a first oblique section is provided on the inclined side surface of the locking tongue close to the opening, and a pushing inclined surface is provided on the locking block; When the locking buckle structure is in the locking position, the pushing inclined plane of the drawer in the pull-out position pushes against the first oblique section and moves the push lock body to move the locking block over the locking tongue to the closed position for locking.

Furthermore, a second straight surface is provided on one side of the locking tongue away from the opening, and a third straight surface is provided on one side of the locking block near the opening; When the locking buckle structure is in the locked position, the locking block of the drawer in the closed position pushes the second straight surface of the locking tongue towards the opening direction, and the second straight surface interferes with the third straight surface to lock the drawer.

Furthermore, the locking buckle structure further comprises multiple second elastic members, one end of which is fixed on the push lock body, and the other end of the second elastic member is connected to a locking tongue; The locking tongue protrudes outward from the surface of the push lock body, and there is a locking tongue accommodating groove on the push lock body, which can be pressed into the locking tongue accommodating groove.

Furthermore, a first straight surface is provided on one side of the locking tongue near the opening of the drawer box, and a second straight surface is provided on the other side away from the opening. The first straight surface is opposite to the second straight surface; When the locking buckle structure is in the locking position, the locking block of the drawer in the closed position pushes the second straight surface of the locking tongue towards the opening direction, and the first straight surface interferes with the push lock body to lock the drawer.

Furthermore, a second oblique section is provided on one side of the locking tongue facing the installation direction of the locking buckle structure.

This utility model also provides a drawer box, comprising a locking buckle structure as described in any one of the preceding items.

The beneficial effects of this utility model are:

1. By operating the locking buckle structure once, multiple drawers of the drawer box can be locked and unlocked simultaneously, reducing the number of steps required for users to operate.
2. The lock structure can automatically remain in the locked position. When the lock structure is in the locked position, each drawer in the open position pushes the lock body to achieve the function of freely locking a single drawer, further reducing the user's operating steps.

To make the advantages of the present utility model clearer, the following will further describe the implementation method of the present utility model in conjunction with the accompanying drawings.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
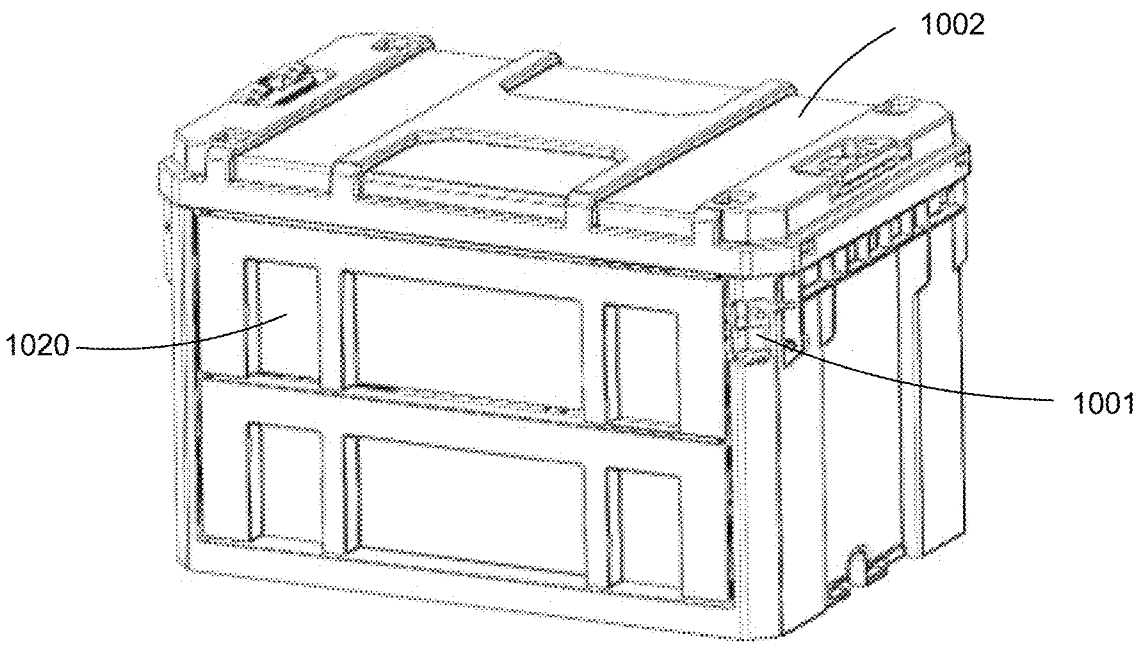
FIG. 1 is a schematic diagram of a drawer box in an embodiment of the present utility model.

To further elaborate on the technical means and effects adopted by the present utility model to achieve the intended purpose, the specific implementation methods, structures, features, and effects of the locking buckle structure and drawer box proposed based on the present utility model are described in detail below, combined with the accompanying drawings and implementation examples.

The aforementioned and other technical content, features, and functions of this utility model will be clearly presented in the detailed description of the implementation examples in conjunction with the reference diagram below. Through the explanation of specific implementation methods, a deeper and more specific understanding of the technical means and effects adopted by the present utility model to achieve the intended purpose can be obtained. However, the attached drawings are only for reference and explanation, and are not intended to limit the present utility model.

Example 1

Please refer to FIGS. 1 to 4 together. The present embodiment of the utility model provides a locking buckle structure 1001, which is mainly used in drawer box 1002, reducing user operation steps and having a simple structure. The locking buckle structure 1001 includes a push lock body 1010, multiple first elastic members 1011 set on the push lock body 1010, and multiple locking tongues 1012. The multiple first elastic members 1011 are located between the push lock body 1010 and the multiple locking tongues 1012, and each locking tongue 1012 is set on the push lock body 1010 through a first elastic member 1011. The first elastic member 1011 is used to automatically eject the locking tongue 1012 relative to the push lock body 1010, thereby keeping the locking buckle structure 1001 in a locked state.

Drawer box 1002 includes a drawer box body 1025 and multiple independent drawers 1020 arranged within the drawer box body 1025. Specifically, multiple drawers 1020 are arranged vertically within the drawer box body 1025, which has an opening, and each drawer 1020 can be pulled out from the opening of the drawer box body 1025.

Locking buckle structure 1001 has a locking/unlocking position, and drawer 1020 moves between a closed position and an open position through a closing direction and pulling direction. When the locking buckle structure 1001 is in the locked position, the drawer 1020 in the closed position is locked with the corresponding locking tongue 1012. The drawer 1020 in the pulled out or open position can be moved to the closed position and locked with the corresponding locking tongue 1012; When the locking buckle structure 1001 is in the unlocked position, the drawers 1020 located in the closed or pulled out position are all unlocked with the corresponding locking tongue 1012. At this time, all drawers 1020 can freely move between the closed and through the pulled out to the fully open positions. The drawer box 1002 of this utility model utilizes a locking buckle structure 1001 to simultaneously lock/unlock multiple drawers 1020, reducing user operation steps; Meanwhile, when the locking buckle structure 1001 is in the locked position, the drawer 1020 located in the pull-out position can be individually closed and automatically locked by the locking buckle structure 1001, further reducing the user's operational steps.

Figure 5:
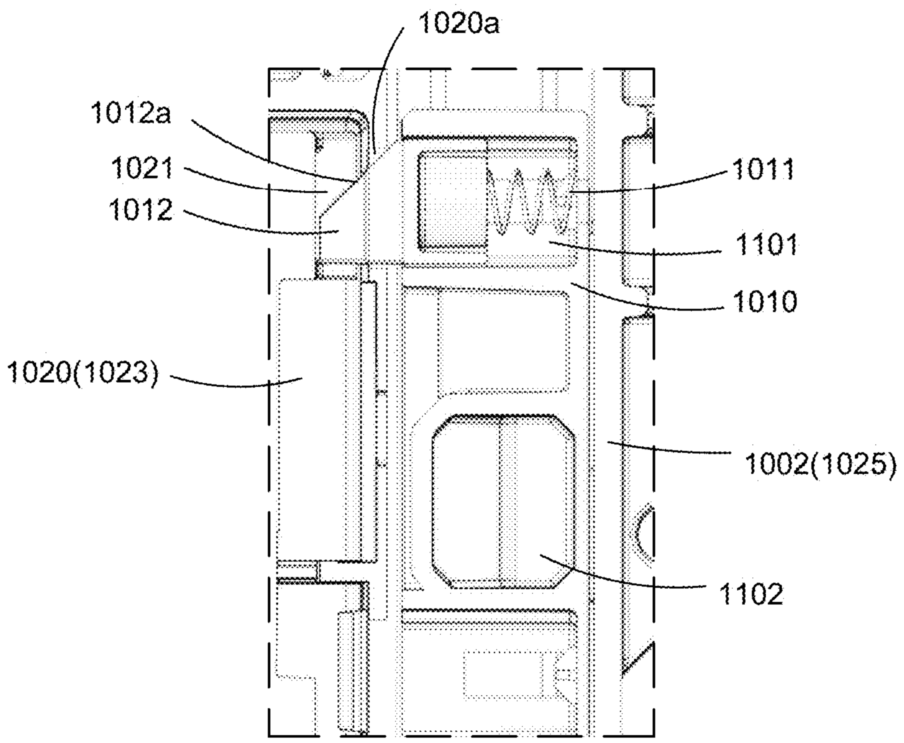
FIG. 5 is a schematic diagram of the process of unlocking drawers with the locking buckle structure of FIG. 2.
Figure 7:
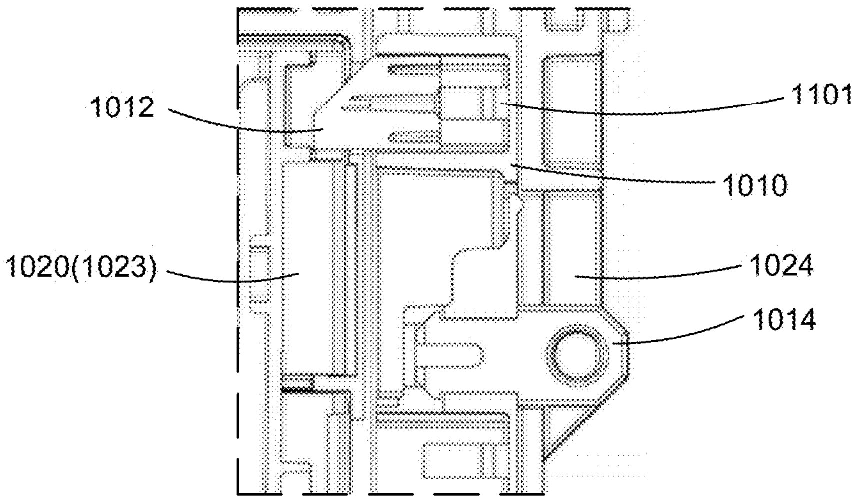
FIG. 7 is yet another schematic diagrams of the process of unlocking drawers with the locking buckle structure.

As shown in FIGS. 5 and 7, each drawer 1020 is equipped with a locking block 1022 corresponding to the locking tongue 1012. The locking block 1022 is matched with the locking tongue 1012 to prevent the drawer 1020 from pulling out from the opening, thereby locking the drawer 1020. When the locking buckle structure 1001 is in the locked position, the locking block 1022 of the drawer 1020 in the pulled out position can move over the corresponding locking tongue 1012 to the closed position to lock. At this time, the locking block 1022 is located on the side of the locking tongue 1012 away from the opening of the drawer box 1002; During this process, the locking tongue 1012 is located on the movement path of the locking block 1022. When the locking buckle structure 1001 is in the unlocked position, the locking block 1022 of the drawer 1020 in the pulled out position cannot be locked by crossing the locking tongue 1012; During this process, the locking tongue 1012 is not located on the movement path of the locking block 1022. It should be noted that when the locking tongue 1012 is located on the movement path of the locking block 1022, the locking tongue 1012 is horizontally aligned with the locking block 1022 before and after, and when the drawer 1020 moves from the pull-out position to the closed position, the locking block 1022 can cross the locking tongue 1012; When the locking tongue 1012 is not on the movement path of the locking block 1022, the locking tongue 1012 is located above the locking block 1022. In other embodiments, when the locking tongue 1012 is not on the movement path of the locking block 1022, the locking tongue 1012 can be located below the locking block 1022, and the locking tongue 1012 can also be located in the horizontal direction before and after the locking block 1022, and the locking block 1022 can never cross the locking tongue 1012.

Figure 6:
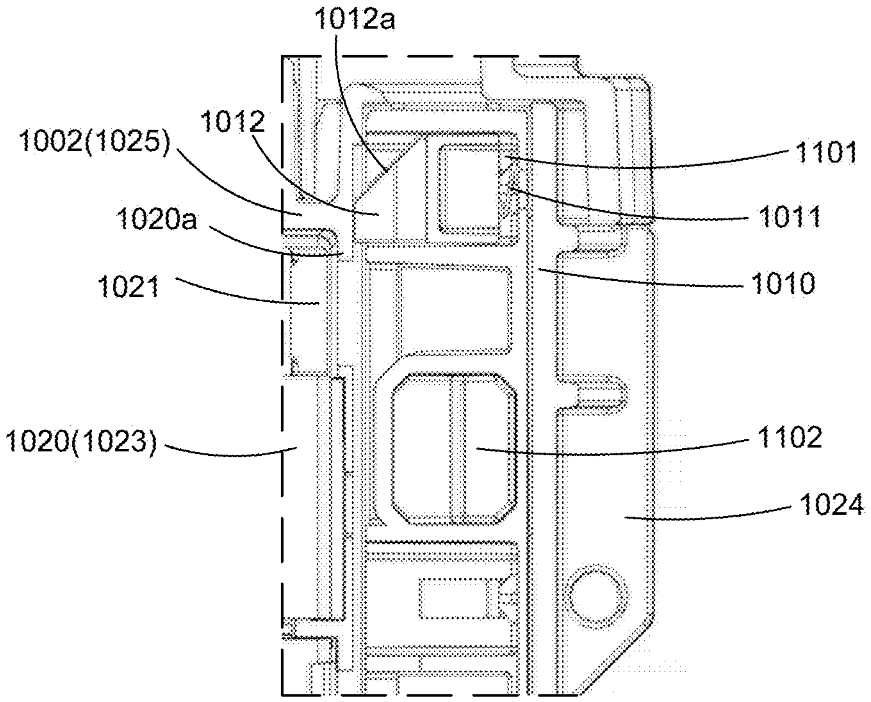
FIG. 6 is another schematic diagram of the process of unlocking drawers with the locking buckle structure of FIG. 2.

Furthermore, each locking block 1022 forms a locking groove 1021 around the drawer body 1023, which is located on the side of the locking block 1022 near the opening. When the locking buckle structure 1001 is in the locked position and drawer 1020 is in the closed position, the locking tongue 1012 is stuck in the locking groove 1021 of the corresponding drawer 1020, thereby avoiding the shaking of drawer 1020 when locked; As shown in FIG. 6, when the locking buckle structure 1001 is in the unlocked position, each locking tongue 1012 detaches from the locking groove 1021.

The push lock body 1010 to move back and forth under force to switch the locking position and unlocking position of the locking buckle structure 1001. In this embodiment, the push lock body 1010 moves up and down, and moving up the push lock body 1010 can move the locking buckle structure 1001 to the unlocked position. The locking tongue 1012 is located above the locking block 1022 and not on the movement path of the locking block 1022; Pushing down the push lock body 1010 can move the locking buckle structure 1001 to the locking position, and the locking tongue 1012 is located on the movement path of the locking block 1022. The locking block 1022 can cross the locking tongue 1012 to lock.

Furthermore, as shown in FIGS. 5 and 7, a first oblique section 1012*a* is provided on the locking tongue 1012, and a support portion 1020*a* is provided on the drawer 1020 or drawer box body 1025. When the support portion 1020*a* is in contact with the first oblique section 1012*a*, the locking buckle structure 1001 remains in the locked or unlocked position, so that the locking buckle structure 1001 will not shift due to external forces. In this embodiment, the locking buckle structure 1001 moves up and down, and the first oblique section 1012*a* is set on the upper side of the locking tongue 1012. When the locking buckle structure 1001 moves up to the unlocked position, the first oblique section 1012*a* is in contact with the support portion 1020*a*, thereby keeping the locking buckle structure 1001 in the unlocked position. In other embodiments, the first oblique section 1012*a* can also be set on the lower side of the locking tongue 1012 and one side away from the opening, with the direction set on the locking tongue 1012 being the same as the unlocking/locking direction of the locking buckle structure 1001.

The push lock body 1010 is equipped with a locking tongue accommodating groove 1101. The first elastic member 1011 is a spring, and one end of the first elastic member 1011 (spring) is fixed in the locking tongue accommodating groove 1101. The locking tongue 1012 is fixed at the other end of the first elastic member 1011 (spring). When the first elastic member 1011 (spring) is compressed by force, the locking tongue 1012 can partially or completely retract into the locking tongue accommodating groove 101, so that the locking block 1022 can cross the locking tongue 1012 and lock. In this embodiment, when the locking buckle structure 1001 moves to the unlocked position, the locking tongue 1012 is squeezed by the drawer 1020 and remains in a partially retracted state within the locking tongue accommodating groove 1101 (as shown in FIG. 6). In this way, because the locking tongue 1012 and the first elastic members 1011 are separately assembled components, a push lock body 1010 can reserve multiple assembly positions for the locking tongue 1012, allowing for the design of unlocking and locking multiple drawers 1020 at will, without the need for different numbers of drawers 1020 to be matched with multiple push lock bodies 1010, saving costs.

In other embodiments, the first elastic member 1011 of the push lock body 1010 is a spring, one end of the first elastic member 1011 (spring) is fixed on the push lock body 1010, and the locking tongue 1012 is fixed on the other end of the first elastic member 1011 (spring). When the first elastic member 1011 (spring) is bent, the locking tongue 1012 can partially or completely retract into the locking tongue accommodating groove 1101.

Please refer to FIGS. 5 to 7 again. In this embodiment, when the push lock body 1010 is moved upwards, the locking tongue 1012 is compressed and compressed back into the locking tongue accommodating groove 1101 by the support portion 1020*a*, and the locking buckle structure 1001 is moved to the unlocked position. The locking tongue 1012 is compressed and continuously retracted back into the locking tongue accommodating groove 1101 by the support portion 1020*a* to maintain the unlocked position unchanged; When the push lock body 1010 is moved downwards, the locking tongue 1012 is squeezed out of the support portion 1020*a* and moved into the corresponding locking groove 1021, and the locking tongue 1012 is engaged in the locking groove 1021 under the action of the first elastic member 1011.

Figure 8:
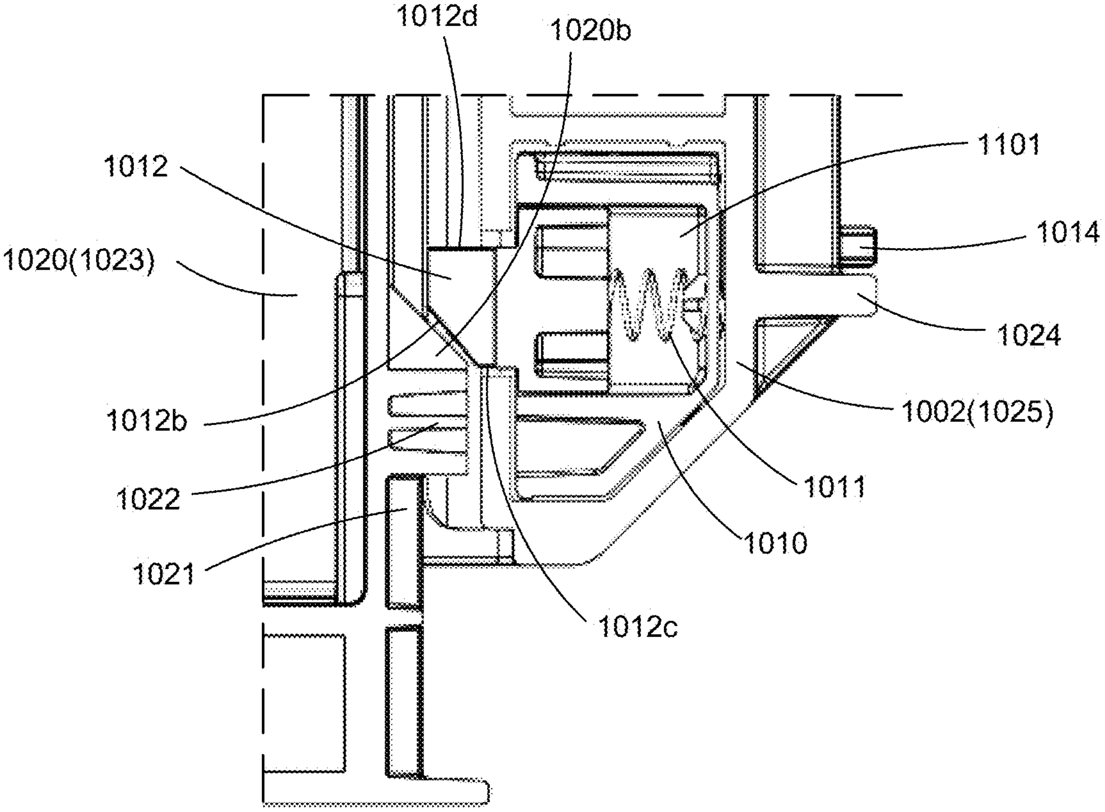
FIG. 8 is a schematic diagram of the process of locking the drawer with the locking buckle structure of FIG. 2.
Figure 9:
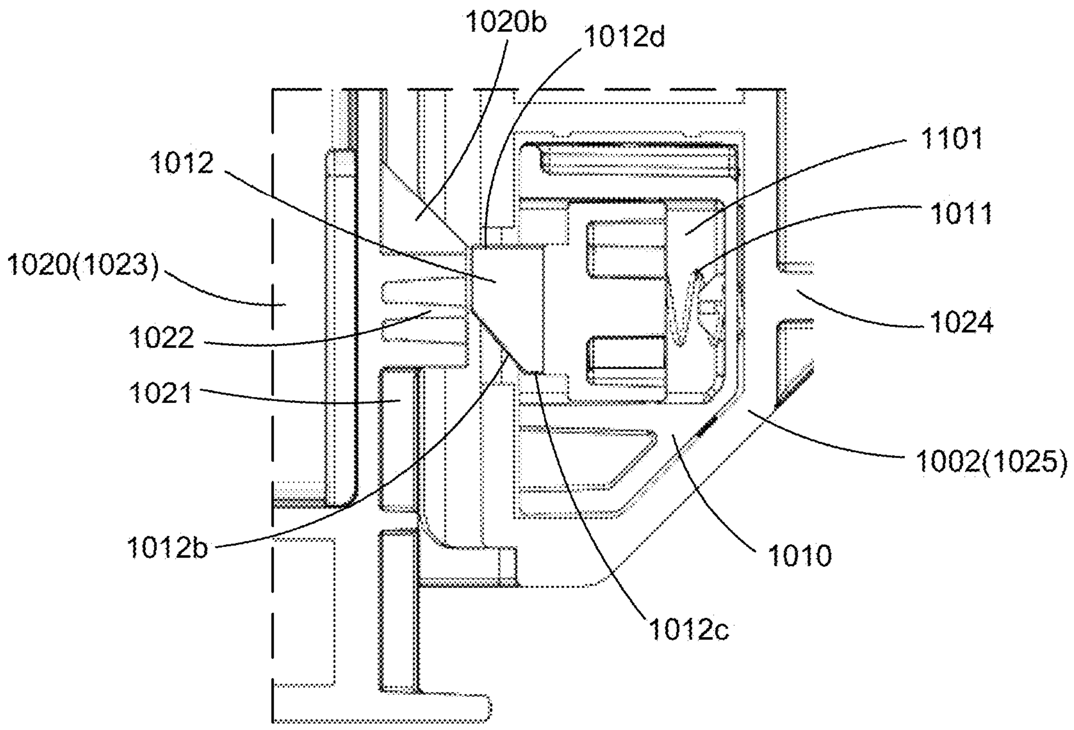
FIG. 9 is another schematic diagram of the process of locking the drawer with the locking buckle structure of FIG. 2.
Figure 10:
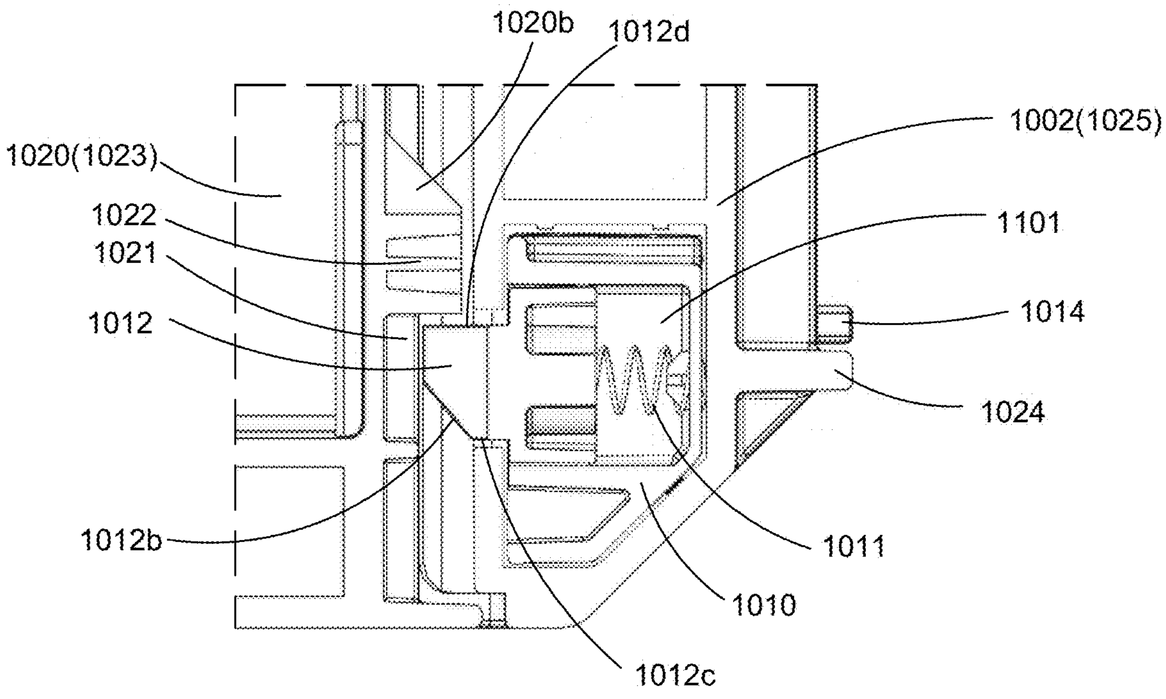
FIG. 10 is yet another schematic diagram of the process of locking the drawer with the locking buckle structure of FIG. 2.
Figure 11:
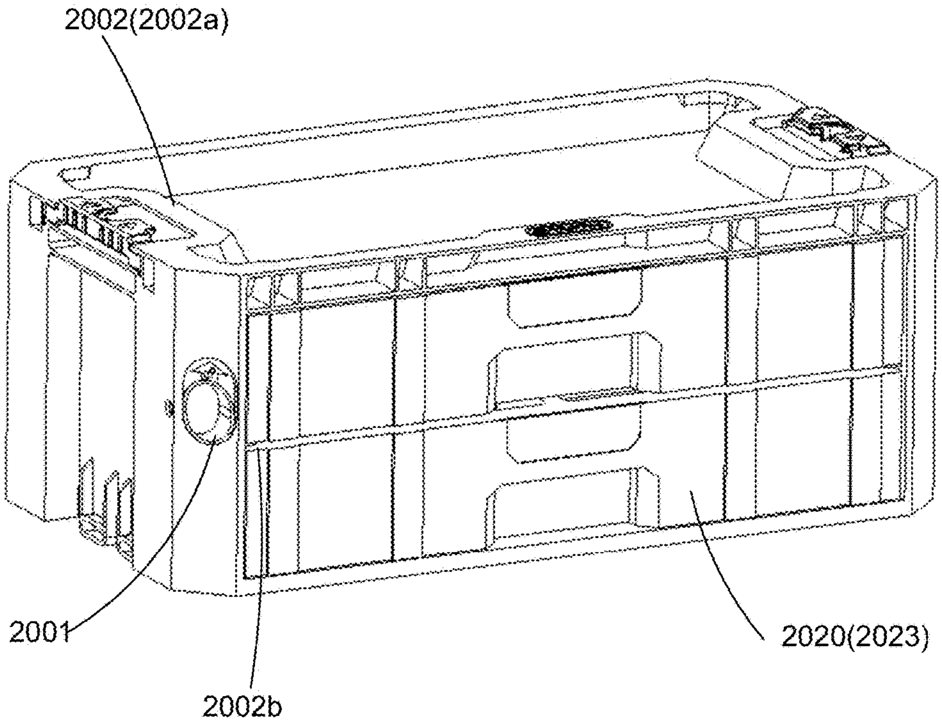
FIG. 11 is a schematic diagram of the structure of a drawer box in an embodiment of the present utility model.

Please refer to FIGS. 8 to 10. On one side of the locking tongue 1012 near the opening, there is also a second oblique section 1012*b*. The direction of the second oblique section 1012*b* set on the locking tongue 1012 is opposite to the locking direction of the drawer 1020, so that it interferes with the locking direction of the drawer 1020. The locking block 1022 of drawer 1020 is equipped with a pushing part 1020*b*. When the locking buckle structure 1001 is in the locked position, the pushing part 1020*b* pushes the second oblique section 1012*b* to retract the locking tongue 1012 relative to the push lock body 1010 during the process of moving drawer 1020 from the pulled out position to the closed position. The pushing part 1020*b* of drawer 1020 located in the pulled out position can push the second oblique section 1012*b* to move over the locking tongue 1012 and lock it in the closed position. In this embodiment, when the drawer 1020 is moved to the closed position, the locking tongue 1012 corresponds to the position of the locking groove 1021, and the locking tongue 1012 extends into the locking groove 1021 under the action of the first elastic member 1011 (as shown in FIG. 10).

Furthermore, on the same side of the locking tongue 1012 as the second oblique section 1012*b*, there is a first straight surface 1012*c*, and on the opposite side of the second oblique section 1012*b*, there is a second straight surface 1012*d*. The first straight surface 1012*c* is opposite to the second straight surface 1012*d*; When the locking buckle structure 1001 is in the locked position, the locking block 1022 of the drawer 1020 in the closed position pushes the second straight surface 1012*d* towards the opening direction and moves towards the opening direction. At this time, the first straight surface 1012*c* interferes with the push lock body 1010 and cannot be moved. The locking tongue 1012 remains ejected, and the drawer 1020 cannot be opened.

The push lock body 1010 is equipped with a hand picking position 1102, which is used for fingers to insert and move the locking buckle structure 1001, thereby causing the locking buckle structure 1001 to move between the locking position and the unlocking position.

Figure 2:
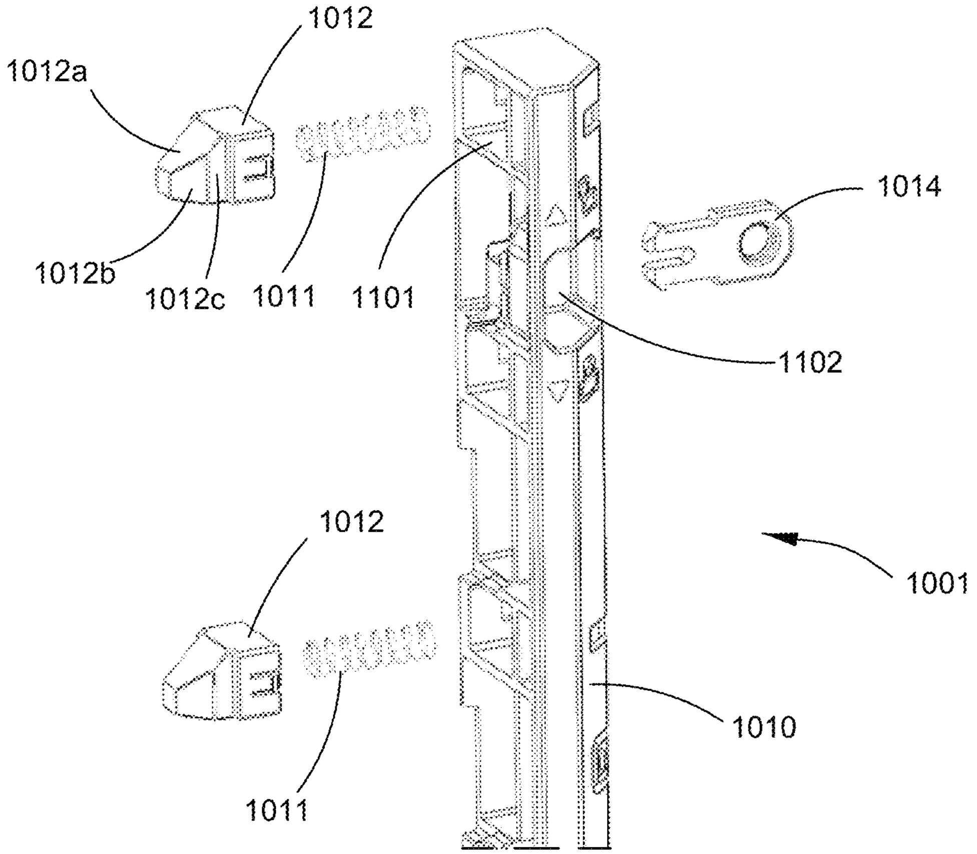
FIG. 2 is a schematic diagram of the locking buckle structure of an embodiment of the present utility model.
Figure 3:
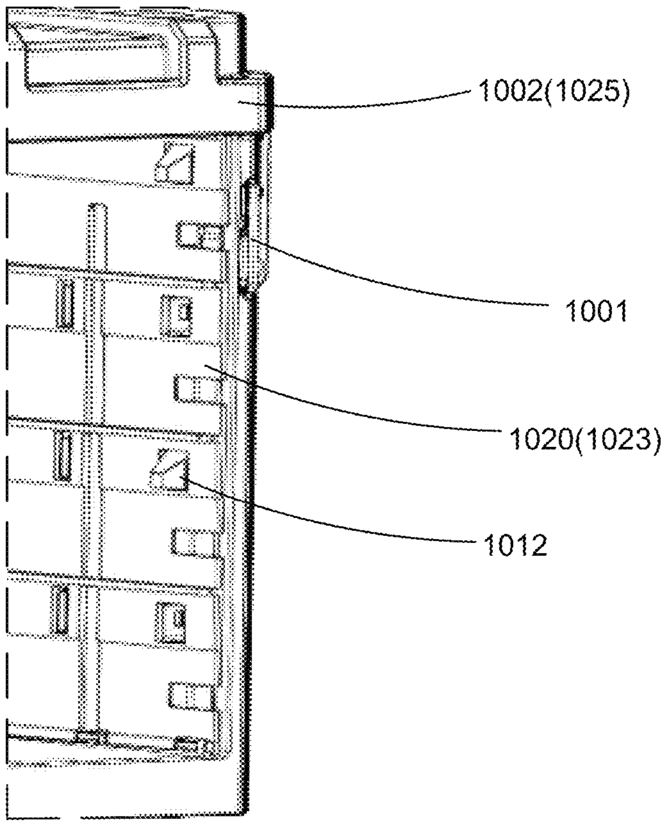
FIG. 3 is a partial schematic diagram of a drawer box in an embodiment of the present utility model.
Figure 4:
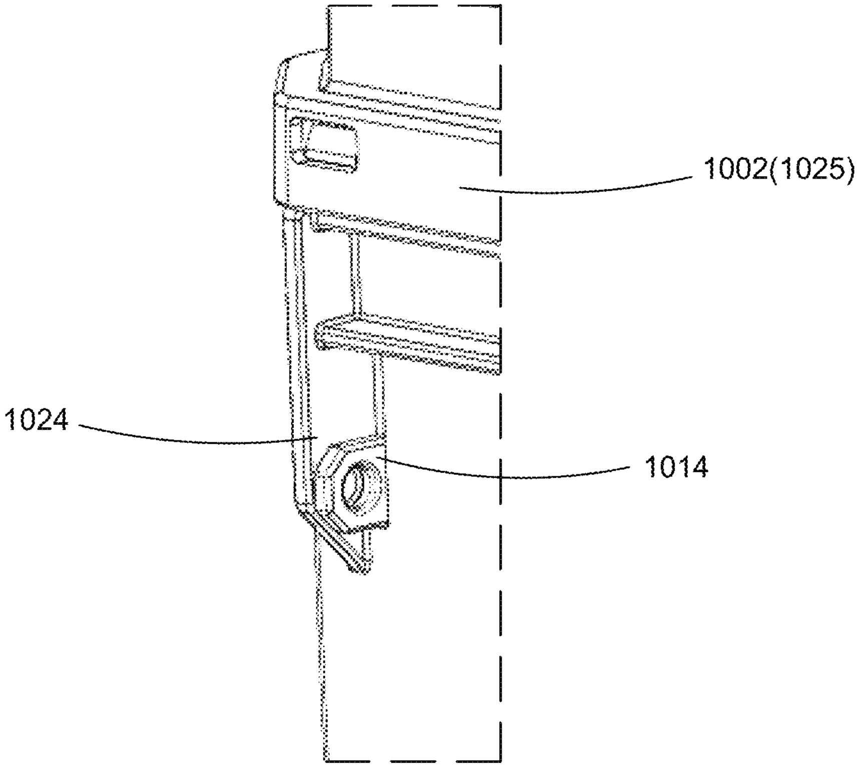
FIG. 4 is another partial schematic diagram of the drawer box in an embodiment of the present utility model.

Please refer to FIGS. 2, 4, and 7 together. The locking buckle structure 1001 also includes a lock bolt 1014, which is fixed on the push lock body 1010. The drawer box 1002 is equipped with a buckle 1024 that matches the lock bolt 1014. Both the locking bolt 1014 and the buckle 1024 are equipped with locking holes. When the locking buckle structure 1001 moves to the locked position, the locking holes on the locking bolt 1014 and the buckle 1024 overlap. At this time, an external lock can be added to lock the locking bolt 1014 and the buckle 1024, thereby keeping the locking buckle structure 1001 in the locked position.

Furthermore, the locking buckle structure 1001 may also include a second elastic member (not shown), which automatically maintains the locking position of the locking buckle structure 1001. Specifically, the second elastic member is a spring, with its two ends fixed on the drawer box body and the push lock body respectively. When the locking buckle structure 1001 overcomes the elasticity of the second elastic member and moves to the unlocked position, any drawer 1020 can be moved to the pulled out position; When the force applied to the locking buckle structure 1001 is released, the push lock body 1010 automatically moves downwards under the rebound force of the second elastic member, causing the locking buckle structure 1001 to return to the locked position. It should be noted that since the second elastic member can automatically keep the locking buckle structure 1001 in the locked position, after setting the second spring, there is no need to set the first oblique section 1012*a* on the locking tongue 1012, and there is no need to set the support portion 1020*a* on the drawer 1020 or drawer box body 1025.

Example 2

Please refer to FIGS. 11 to 17 together. The present embodiment of the utility model provides a locking buckle structure 2001, which is mainly used in drawer box 2002, reducing user operation steps and having a simple structure. Among them, the locking buckle structure 2001 includes a push lock body 2010 and multiple locking tongues 2012 set on the push lock body 2010, which need to be moved simultaneously to lock/unlock. There are multiple independent drawers 2020 inside drawer box 2002 (only 2 are schematically shown in the figure), and each locking tongue 2012 corresponds to a drawer 2020 position. Locking buckle structure 2001 has a locking/unlocking position, and drawer 2020 has a closing/pulling position; When the locking buckle structure 2001 is in the locked position, the drawer 2020 in the closed position is locked with the corresponding locking tongue 2012. The drawer 2020 in the pulled out position can be moved to the closed position and locked with the corresponding locking tongue 2012; When the locking buckle structure 2001 is in the unlocked position, all drawers 2020 are unlocked with the corresponding locking tongue 2012. At this time, all drawers 2020 can be freely pulled out and closed.

Specifically, drawer box 2002 includes a drawer box body 2002*a*, with multiple drawers 2020 arranged vertically within the drawer box body 2002*a*. The drawer box body 2002*a* has an opening 2002*b*, and the drawer 2020 can be pulled out from the opening 2002*b* of the drawer box body 2002*a*.

Each drawer 2020 is equipped with a locking block 2022 corresponding to the locking tongue 2012. The locking block 2022 is matched with the locking tongue 2012 to prevent the drawer 2020 from being pulled out from the opening 2002*b*, thereby locking the drawer 2020. When the locking buckle structure 2001 is in the locked position, the locking block 2022 of the drawer 2020 in the pulled out position can move over the corresponding locking tongue 2012 to the closed position to lock. At this time, the locking block 2022 is located on the side of the locking tongue 2012 away from the opening 2002*b* of the drawer box 2002; During this process, the locking tongue 2012 is located on the movement path of the locking block 2022. When the locking buckle structure 2001 is in the unlocked position, the locking block 2022 of the drawer 2020 in the pulled out position cannot be locked by crossing the locking tongue 2012; During this process, the locking tongue 2012 is not located on the movement path of the locking block 2022. It should be noted that when the locking tongue 2012 is located on the movement path of the locking block 2022, the locking tongue 2012 is horizontally aligned with the locking block 2022 before and after, and when the drawer 2020 moves from the pull-out position to the closed position, the locking block 2022 can cross the locking tongue 2012; When the locking tongue 2012 is not on the movement path of the locking block 2022, the locking tongue 2012 is located above the locking block 2022. In other embodiments, when the locking tongue 2012 is not on the movement path of the locking block 2022, the locking tongue 2012 can be located below the locking block 2022, and the locking tongue 2012 can also be located in the horizontal direction before and after the locking block 2022, and the locking block 2022 can never cross the locking tongue 2012.

Figure 12:
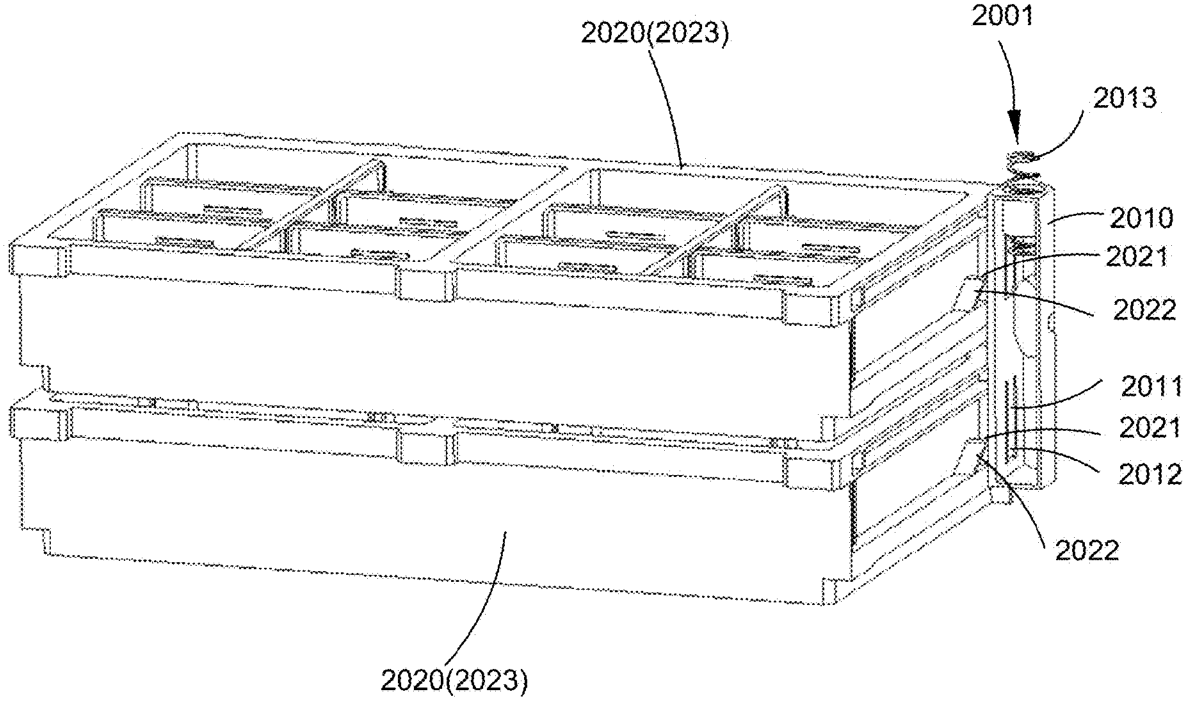
FIG. 12 is a schematic diagram of the structure of the drawer box after the drawer box body is hidden in an embodiment of the present utility model.
Figure 13:
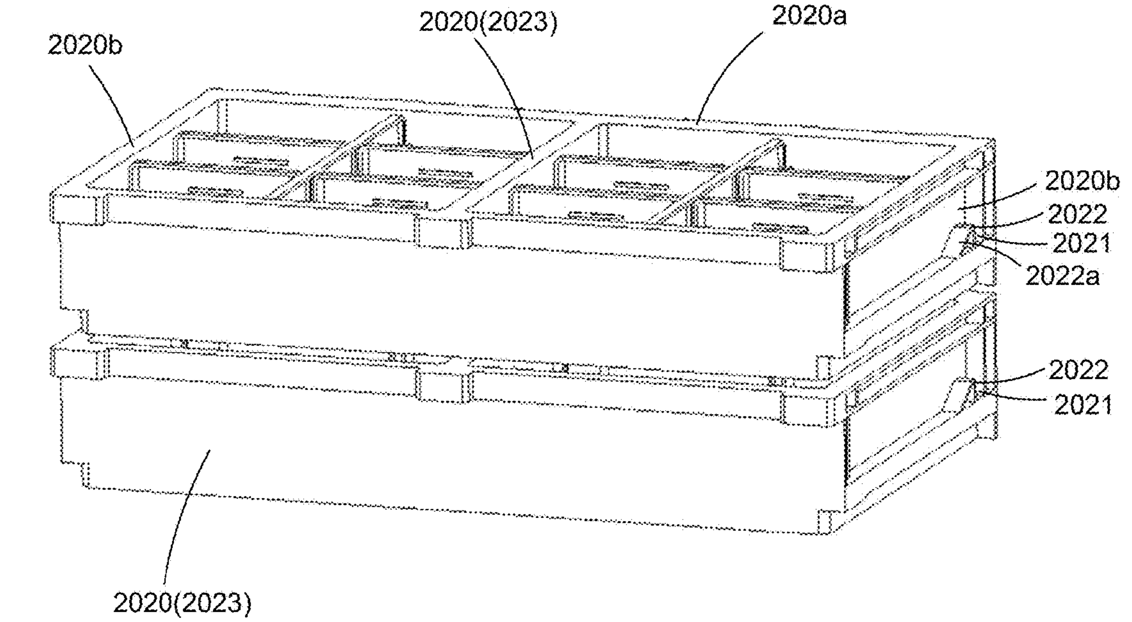
FIG. 13 is a schematic diagram of the structure of a drawer in an embodiment of the present utility model.
Figure 14:
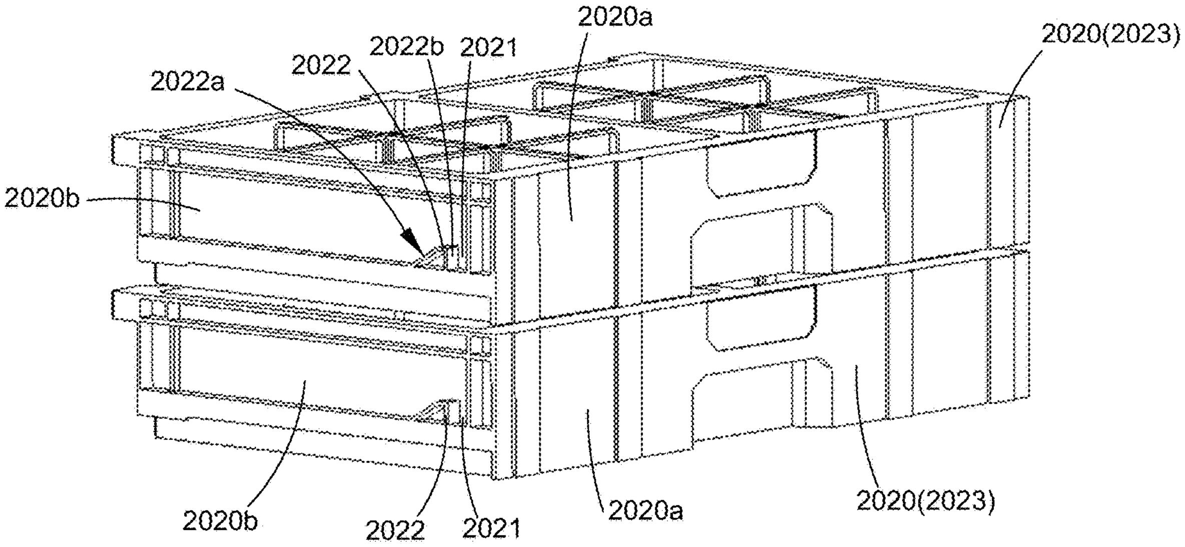
FIG. 14 is another schematic diagram of the drawer structure in an embodiment of the present utility model.
Figure 15:
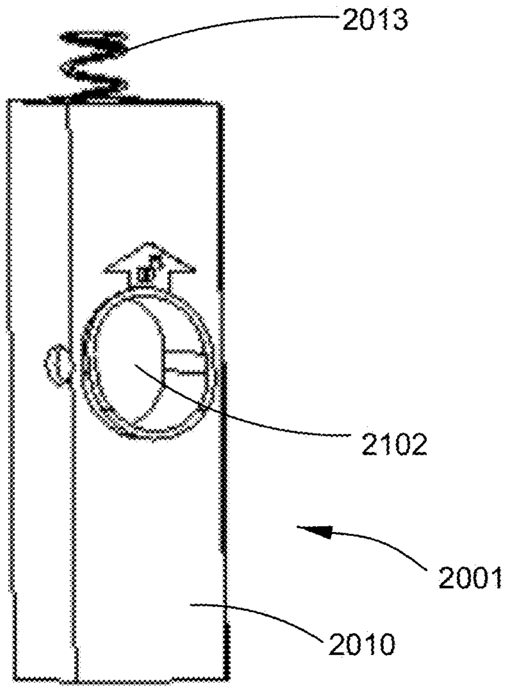
FIG. 15 is a schematic diagram of the locking buckle structure of an embodiment of the present utility model.

Each locking block 2022 forms a locking groove 2021 around the drawer body 2023, which is located on the side of the locking block 2022 near the opening 2002*b*. When the locking buckle structure 2001 is in the locked position and the drawer 2020 is in the closed position, the locking tongue 2012 is stuck in the corresponding locking groove 2021 (as shown in FIG. 12); When the locking buckle structure 2001 is in the locked position and drawer 2020 is in the pulled out position, moving drawer 2020 to the closed position can cause the locking block 2022 to cross the locking tongue 2012 to engage the locking tongue 2012 in the corresponding locking groove 2021, thereby locking drawer 2020.

Drawer 2020 has a drawer panel 2020*a* and two drawer side panels 2020*b* connected at both ends of the drawer panel 2020*a*, a drawer back panel (not indicated in the figure) set opposite to the drawer panel 2020*a*, and a drawer bottom plate connected to the drawer panel 2020*a*, drawer side panels 2020*b*, and the bottom of the drawer back panel (not indicated in the figure). When drawer 2020 is in the closed position, drawer panel 2020*a* is exposed from opening 2002*b*.

Figure 16:
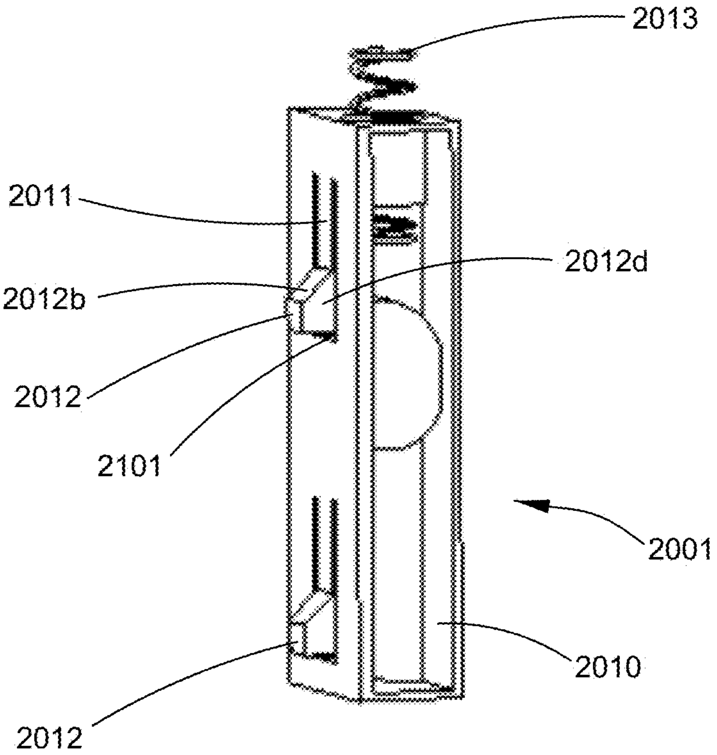
FIG. 16 is another schematic diagram of the locking buckle structure of an embodiment of the present utility model.
Figure 17:
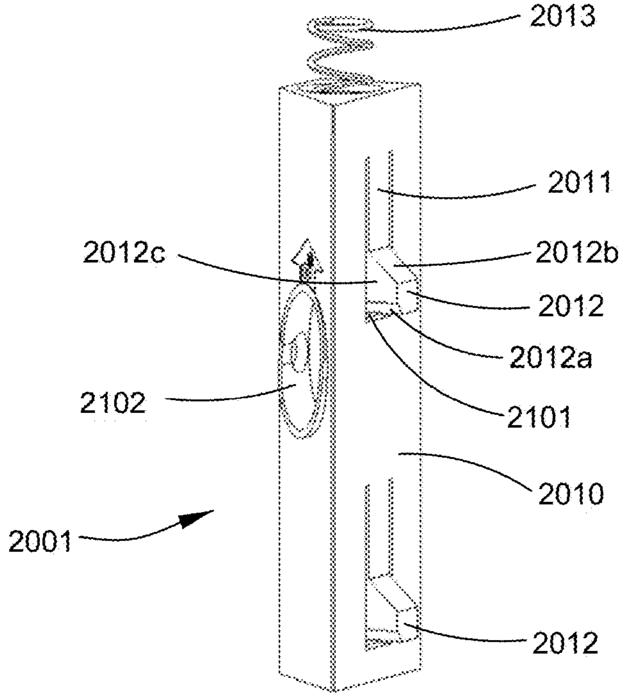
FIG. 17 is another schematic diagram of the locking buckle structure of an embodiment of the present utility model.

In this embodiment, the locking block 2022 is provided on one of the drawer side panels 2020*b*. Each locking block 2022 forms a locking groove 2021 around the drawer body 2023, which is located on the side of the locking block 2022 near the drawer panel 2020*a* (opening 2002*b*). When the locking buckle structure 2001 is in the locked position and drawer 2020 is in the closed position, the locking tongue 2012 is stuck in the locking groove 2021 of the corresponding drawer 2020, thereby avoiding the shaking of drawer 2020 when locked; As shown in FIG. 16, when the locking buckle structure 2001 is in the unlocked position, each locking tongue 2012 detaches from the locking groove 2021.

The drawer box 2002 of this utility model utilizes a locking buckle structure 2001 to simultaneously lock/unlock multiple drawers 2020, reducing user operation steps; Furthermore, when the locking buckle structure 2001 is in the locked position, the drawer 2020 located in the pull-out position can also be individually closed and automatically locked by the locking buckle structure 2001, further reducing the user's operational steps.

The push lock body 2010 to move back and forth under force to switch the locking position and unlocking position of the locking buckle structure 2001. In this embodiment, the push lock body 2010 moves up and down, and moving up the push lock body 2010 can move the locking buckle structure 2001 to the unlocked position. The locking tongue 2012 is located above the locking block 2022 and not on the movement path of the locking block 2022; Pushing down the push lock body 2010 can move the locking buckle structure 2001 to the locking position, and the locking tongue 2012 is located on the movement path of the locking block 2022. The locking block 2022 can cross the locking tongue 2012 to lock. It should be noted that during the process of locking when the locking block 2022 crosses the locking tongue 2012, the locking block 2022 pushes the corresponding locking tongue 2012 to move towards the unlocking position, and then the locking tongue 2012 drives all locking tongues 2012 (i.e. pushing the locking body 2010) to move towards the unlocking position. When the locking block 2022 crosses the locking tongue 2012, all locking tongues 2012 can move downwards together to lock in the locking position.

Furthermore, a first oblique section 2012*a* is provided on the oblique side of the locking tongue 2012 near the opening 2002*b*, and a pushing part 2022*a* is provided on the locking block 2022. When the locking buckle structure 2001 is in the locked position, the a pushing part 2022*a* of the drawer 2020 in the pulled out position pushes the first oblique section 2012*a* and moves the push lock body 2010 to move the locking block 2022 over the locking tongue 2012 to the closed position for locking.

The direction set on the locking tongue 2012 by the first oblique section 2012*a* not only makes it opposite to the closing direction of the drawer 2020, but also enables the linear movement of the pushing part 2022*a* to push the locking tongue 2012 in the vertical direction; In this embodiment, the first oblique section 2012*a* is located on the oblique side of the locking tongue 2012 near the opening 2002*b*, which roughly coincides with the edge at that position. When the locking buckle structure 2001 is in the locked position, during the process of moving drawer 2020 from the pulled out position to the closed position, the first oblique section 2012*a* is pushed against the pushing part 2022*a*, causing the locking tongue 2012 to move up and driving the push lock body 2010 to move up. The locking block 2022 passes over the locking tongue 2012, causing the locking tongue 2012 to correspond with the position of the locking groove 2021. The locking tongue 2012 falls into the locking groove 2021 and locks drawer 2020.

Furthermore, a second straight surface 2012*d* is provided on one side of the locking tongue 2012 away from the opening 2002*b*, and a third straight surface 2022*b* is provided on one side of the locking block 2022 near the opening 2002*b*; When the locking buckle structure 2001 is in the locked position, the locking block 2022 of the drawer 2020 in the closed position pushes the second straight surface 2012*d* of the locking tongue 2012 towards the direction of the opening 2002*b*, and the second straight surface 2002*d* interferes with the third straight surface 2022*b* to lock the drawer 2020.

Furthermore, the locking buckle structure 2001 further includes a second elastic member 2013, which automatically maintains the locking position of the locking buckle structure 2001. Specifically, the second elastic member 2013 is a spring, with its two ends fixed to the drawer box body 2002*a* and the push lock body 2010 respectively. When the locking buckle structure 2001 overcomes the elasticity of the second elastic member 2013 and moves up to the unlocked position, each drawer 2020 can move to the pulled out position. When the force applied to the locking buckle structure 2001 is released, the push lock body 2010 automatically moves down under the rebound force of the second elastic member 2013, causing the locking buckle structure 2001 to return to the locked position.

In this embodiment, the locking buckle structure 2001 further comprises multiple first elastic members 2011, one end of which is fixed on the push lock body 2010, the locking tongue 2012 is connected to the other end of the first elastic member 2011, and the first elastic member 2011 is, for example, a spring piece. The locking tongue 2012 protrudes outward from the surface of the push lock body 2010, and there is a locking tongue accommodating groove 2101 on the push lock body 2010. When the locking tongue 2012 is pushed by external force, the first elastic member 2011 (spring) bends inward, and the locking tongue 2012 can be pressed into the locking tongue accommodating groove 2101. In this design, when the locking buckle structure 2001 is equipped with a first elastic member 2011, the locking buckle structure 2001 can be directly pushed into the installation slot from the installation hole on the drawer box body 2002*a* for installation, and the installation method is relatively simple. On this basis, the locking tongue 2012 is equipped with a first straight surface 2012*c* on the same side as the first oblique section 2012*a*, and the first straight surface 2012*c* is opposite to the second straight surface 2012*d*; When the locking buckle structure 2001 is in the locked position, the locking block 2022 of the drawer 2020 in the closed position pushes the second straight surface 2012*d* towards the opening direction of the drawer panel 2020*a* (opening 2002*b*). At this time, the first straight surface 2012*c* interferes with the push lock body 2010, causing the locking tongue 2012 to not move towards the locking tongue accommodating slot 2101, thereby locking the drawer 2020 and preventing it from being opened.

Furthermore, on one side of the locking tongue 2012 facing the installation direction of the locking buckle structure 2001, there is a second oblique section 2012*b*. When installing the locking buckle structure 2001, the locking tongue 2012 is pressed into the locking tongue accommodating groove 2101 by pressing against the drawer box body 2002*a* through the second oblique section 2012*b*. After the locking buckle structure 2001 is installed in place, the locking tongue 2012 automatically pops out. In this embodiment, the locking buckle structure 2001 is installed into the installation hole from bottom to top, and the second oblique section 2012*b* is set on the upper surface of the locking tongue 2012.

In other embodiments, the locking tongue 2012 can also be directly fixed on the push lock body 2010 and protrudes outward from the surface of the push lock body 2010. For example, the locking tongue 2012 can be integrally formed with the push lock body 2010. It should be noted that when the locking tongue 2012 is fixed, there is no need to install a first elastic member 2011, a second oblique section 2012*b*, and a first straight surface 2012*c* on the locking tongue 2012.

Furthermore, the push lock body 2010 is equipped with a hand picking position 2102, which is used for fingers to insert and move the locking buckle structure 2001, thereby causing the locking buckle structure 2001 to move between the locked and unlocked positions.

The beneficial effects of this utility model are:

1. By operating the locking buckle structure 1001,2001 once, multiple drawers 1020,2020 of drawer box 1002, 2002 can be simultaneously locked and unlocked, reducing the user's operational steps.
2. When drawer 1020,2020 is opened, when the locking buckle structure 1001,2001 is in the locked position, the function of freely locking a single drawer 1020, 2020 can be achieved without operating the push lock body 1010,2010, further reducing the user's operating steps.

In the description of this utility model, it should be noted that unless otherwise specified and limited, the terms "installation", "connection", and "connection" should be broadly understood, for example, they can be fixed connections, detachable connections, or integrated connections; It can be a mechanical connection or an electrical connection; It can be directly connected, or indirectly connected through an intermediate medium, or it can be an internal connection between two components. For ordinary technical personnel in this field, they can understand the specific meanings of the above terms in this utility model based on specific circumstances.

The above is only an embodiment of the present utility model and does not impose any formal limitations on the present utility model. Although the present utility model has been disclosed as an embodiment, it is not intended to limit the present utility model. Any technical personnel familiar with the profession, within the scope of the technical solution of the present utility model, may make slight changes or modify the disclosed technical content into equivalent embodiments, Any simple modifications, equivalent changes, or modifications made to the above embodiments based on the technical essence of the present utility model, which are not separated from the technical solution of the present utility model, shall still fall within the scope of the technical solution of the present utility model.

We claim:

1. A locking buckle structure used in a drawer box with multiple drawers, comprising:

a push lock body;

multiple locking tongues set on the push lock body, wherein the locking buckle structure has a locked position and an unlocked position, and the each of the multiple drawers has a closed position and a pulled out position;

wherein the drawer box comprises multiple drawers, with each of the multiple drawers comprising a locking block corresponding with a respective locking tongue;

wherein when the locking buckle structure is in the locked position, the drawers in the closed position are locked with the corresponding locking tongues, and wherein when the drawers are in the pulled out position, the drawers can be moved to the closed position and locked with the corresponding locking tongues; and wherein when the locking buckle structure is in the unlocked position, the drawers are all unlocked with the corresponding locking tongue.

2. The locking buckle structure of claim 1, further comprising a first elastic member located between the push lock body and each locking tongue, which automatically ejects the locking tongue relative to the push lock body.

3. The locking buckle structure of claim 2, wherein when the locking buckle structure is in the locked position, the locking block of the drawer in the pulled out position can be locked by passing over the locking tongue, such that the locking block is located on the side of the locking tongue away from the opening of the drawer box.

4. The locking buckle structure of claim 3, wherein each locking block is enclosed in a locking groove with a drawer body, and the locking groove is located on the side of the locking block near the opening of the drawer box, and wherein when the locking buckle structure is in the locked position and the drawer is in the closed position, the locking tongue is clamped in the corresponding locking groove.

5. The locking buckle structure of claim 3, further comprising a second oblique section provided on one side of the locking tongue near the opening, and a pushing part provided on the locking block, wherein when the locking buckle structure is in the locked position, the pushing part of the drawer located in the pulled out position pushes the second oblique section over the locking tongue to move to the closed position and lock.

6. The locking buckle structure of claim 5, further comprising a first straight surface provided on the same side as the second oblique section on the locking tongue, and a second straight surface provided on the opposite side of the first straight surface, the first straight surface being opposite to the second straight surface, wherein when the locking buckle structure is in the locked position, the locking block of the drawer in the closed position pushes the second straight surface of the locking tongue towards the opening direction, such that the first straight surface interferes with the push lock body and the locking tongue remains ejected.

7. The locking buckle structure of claim 2, further comprising a first oblique section provided on the locking tongue, and a support portion provided on the drawer or drawer box body, wherein when the support portion is in contact with the first oblique section, the locking buckle structure remains in the locked or unlocked position.

8. The locking buckle structure of claim 2, wherein the push lock body is provided with a locking tongue accommodating groove, the first elastic member is a spring, one end of the first elastic member is fixed in the locking tongue accommodating groove, and the locking tongue is fixed at the other end of the first elastic member.

9. The locking buckle structure of claim 2, wherein the push lock body is provided with a locking tongue accommodating groove, the first elastic member is a spring, one end of the first elastic member is fixed on the push lock body, and the locking tongue is fixed on the other end of the first elastic member.

10. The locking buckle structure of claim 1, further comprising a second elastic member, wherein the second elastic member is located between the locking buckle structure and the drawer box, and the second elastic member automatically maintains the locking buckle structure in the locked position.

11. The locking buckle structure of claim 1, further comprising a locking bolt, which is fixed on the push lock body, and a buckle provided on the drawer box to cooperate with the locking bolt, wherein the locking bolt and the buckle can be simultaneously locked.

12. A drawer box comprising:

multiple drawers each having a closed position and a pulled out position;

a locking buckle comprising:

a push lock body;

multiple locking tongues set on the push lock body, wherein the locking buckle has a locked position and an unlocked position;

wherein each of the multiple drawers comprises a locking block corresponding with a respective locking tongue;

wherein when the locking buckle structure is in the locked position, the drawers in the closed position are locked with the corresponding locking tongues, and wherein when the drawers are in the pulled out position, the drawers can be moved to the closed position and locked with the corresponding locking tongues; and wherein when the locking buckle structure is in the unlocked position, the drawers are all unlocked with the corresponding locking tongue.

13. A locking buckle structure for use in a drawer box with multiple drawers, the locking buckle structure comprising:

a push lock body;

multiple locking tongues set on the push lock body that move simultaneously to lock and unlock the multiple drawers;

wherein the drawer box comprises multiple drawers, with each of the multiple drawers comprising a locking block corresponding with a respective locking tongue;

wherein the locking buckle structure has a locked position and an unlocked position, and the drawer has a closed and a pulled out position;

wherein when the locking buckle structure is in the locked position, the drawer in the closed position is locked with the corresponding locking tongue, and the drawer in the pulled out position can be moved to the closed position and locked with the corresponding locking tongue.

14. The locking buckle structure of claim 13, further comprising a first elastic member located between the push lock body and the drawer box, wherein the first elastic member automatically maintains the locking buckle structure in a locked position.

15. The locking buckle structure of claim 13, wherein when the locking buckle structure is in the locked position, the locking block of the drawer in the pulled out position can be locked by passing over the locking tongue, and the locking block is located on the side of the locking tongue away from the opening away of the drawer box.

16. The locking buckle structure of claim 15, wherein each locking block is enclosed in a locking groove with a drawer body, and the locking groove is located on the side of the locking block near the opening, and wherein when the locking buckle structure is in the locked position and the drawer is in the closed position and the locking tongue is clamped in the corresponding locking groove.

17. The locking buckle structure of claim 15, further comprising a first oblique section is provided on an oblique side of the locking tongue near the opening, and a thrust inclined surface provided on the locking block, wherein when the locking buckle structure is in the locked position, the thrust inclined surface of the drawer in the pulled out position pushes against the first oblique section and moves the push lock body to move the locking block over the locking tongue to the closed position for locking.

18. The locking buckle structure of claim 17, further comprising a second straight surface provided on one side of the locking tongue opposite the opening, and a third straight surface provided on one side of the locking block adjacent to the opening, wherein when the locking buckle structure is in the locked position, the locking block of the drawer in the closed position pushes the second straight surface of the locking tongue towards the direction of the opening, and the second straight surface interferes with the third straight surface to lock the drawer.

19. The locking buckle structure of claim 13, further comprising multiple second elastic members, wherein one end of each of the multiple second elastic members is fixed to the push lock body, and the other end of each of the multiple second elastic members is connected to a locking tongue, wherein the locking tongue protrudes outward from the surface of the push lock body can be pressed into a locking tongue accommodating groove on the push lock body.

20. The locking buckle structure of claim 19, further comprising:

a first straight surface is provided on one side of the locking tongue adjacent to the opening, and a second straight surface is provided on the other side of the locking tongue away from the opening; and a second oblique section is provided on one side of the locking tongue facing the installation direction of the locking buckle structure;

wherein the first straight surface is opposite to the second straight surface, and wherein when the locking buckle structure is in the locked position, the locking block of the drawer in the closed position pushes the second straight surface of the locking tongue towards the direction of the opening, and the first straight surface interferes with the push lock body to lock the drawer.

* * * * *